US012387135B2

(12) United States Patent
Weng et al.

(10) Patent No.: US 12,387,135 B2
(45) Date of Patent: Aug. 12, 2025

(54) MODEL TRAINING METHOD, FAILURE DETERMINING METHOD, ELECTRONIC DEVICE, AND PROGRAM PRODUCT

(71) Applicant: EMC IP Holding Company LLC, Hopkinton, MA (US)

(72) Inventors: Lingdong Weng, Beijing (CN); Bing Liu, Tianjin (CN); Tao Chen, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1018 days.

(21) Appl. No.: 17/460,879

(22) Filed: Aug. 30, 2021

(65) Prior Publication Data

US 2023/0025081 A1    Jan. 26, 2023

(30) Foreign Application Priority Data

Jul. 23, 2021    (CN) .......................... 202110838785.X

(51) Int. Cl.
*G06F 11/00* (2006.01)
*G06F 11/07* (2006.01)
*G06N 20/00* (2019.01)

(52) U.S. Cl.
CPC ........... *G06N 20/00* (2019.01); *G06F 11/008* (2013.01); *G06F 11/0727* (2013.01)

(58) Field of Classification Search
CPC ............... G06F 11/008; G06F 11/0727; G06F 11/0751; G06N 20/00
USPC ........................................................ 714/1–57
See application file for complete search history.

(56) References Cited

U.S. PATENT DOCUMENTS

| 6,247,152 | B1 * | 6/2001 | Russell ............. | G11B 20/1879 |
| 7,506,224 | B2 * | 3/2009 | Ejiri ..................... | G06F 11/2221 |
| | | | | 714/2 |
| 7,653,840 | B1 * | 1/2010 | Taylor .................. | G11C 29/765 |
| | | | | 714/47.2 |
| 8,032,782 | B2 * | 10/2011 | He ....................... | G06F 11/1092 |
| | | | | 714/6.1 |

(Continued)

*Primary Examiner* — Sarai E Butler
(74) *Attorney, Agent, or Firm* — WOMBLE BOND DICKINSON (US) LLP

(57) ABSTRACT

Embodiments of the present disclosure relate to a model training method, a failure determining method, an electronic device, and a computer program product. The model training method includes: acquiring a plurality of disk failure data sets collected in a first time period; acquiring another disk failure data set that is collected at a predetermined time point after the first time period and indicates failure information of at least one failed sector set; and training a failure determining model based on the plurality of disk failure data sets and the failure information, so that a probability of matching of predicted failure information at a predetermined time point determined by the trained failure determining model based on the plurality of disk failure data sets and the failure information is greater than a first threshold probability. By using the technical solution of the present disclosure, it is possible to predict the failure information that will occur in the sector set included in a disk based on the disk failure data set associated with a failed sector, so that a user or administrator of the disk can know the failure condition that will occur in the sector set of the disk in advance.

18 Claims, 4 Drawing Sheets

(56) References Cited

U.S. PATENT DOCUMENTS

| | | | |
|---|---|---|---|
| 2001/0010085 A1* | 7/2001 | Rafanello | G11B 20/1883 |
| | | | 714/10 |
| 2007/0041291 A1* | 2/2007 | Itoga | G11B 19/28 |
| 2015/0269120 A1* | 9/2015 | Nakatsugawa | G11B 27/36 |
| | | | 703/2 |
| 2015/0347212 A1* | 12/2015 | Bartley | G06F 11/0709 |
| | | | 714/37 |
| 2016/0110246 A1* | 4/2016 | Lv | G06F 11/0751 |
| | | | 714/6.12 |
| 2020/0133758 A1* | 4/2020 | Liu | G06F 3/0689 |

* cited by examiner

MODEL TRAINING METHOD, FAILURE DETERMINING METHOD, ELECTRONIC DEVICE, AND PROGRAM PRODUCT

CROSS-REFERENCE TO RELATED APPLICATION

This patent application claims priority, under 35 U.S.C. § 119, of Chinese Patent Application No. 202110838785.X, filed Jul. 23, 2021, which is incorporated by reference in its entirety.

TECHNICAL FIELD

Embodiments of the present disclosure generally relate to computer technologies, and in particular to a model training method, a failure determining method, an electronic device, and a computer program product, which can be used in the fields of disk management and data protection.

BACKGROUND

Many techniques have been proposed for preventing data loss due to disk failures. However, these technologies usually focus on the entire disk failure, and rarely pay attention to the fine-grained disk health condition. At the same time, since a conventional disk failure determination technology focuses on an entire disk, when determining that there is a failure in the disk, unified processing is also performed on the entire disk. In fact, when the disk fails, these failures often occur only in a part of a sector in the disk. Therefore, the conventional disk failure determination technology is insufficient in fineness. Consequently, it cannot support fine-grained processing for the disk, and it is difficult to meet use needs of users and administrators of the disk.

SUMMARY OF THE INVENTION

Embodiments of the present disclosure provide a model training method, a failure determining method, an electronic device, and a computer program product.

In a first aspect of the present disclosure, a model training method is provided. The method includes: acquiring a plurality of disk failure data sets associated with at least one failed sector of a disk and collected in a first time period; acquiring another disk failure data set associated with the at least one failed sector and collected at a predetermined time point after the first time period, the another disk failure data set indicating failure information of at least one failed sector set to which the at least one failed sector belongs; and training a failure determining model based on the plurality of disk failure data sets and the failure information, so that a probability of matching of predicted failure information at a predetermined time point determined by the trained failure determining model based on the plurality of disk failure data sets and the failure information is greater than a first threshold probability.

In a second aspect of the present disclosure, a failure determining method is provided. The method includes: acquiring a plurality of disk failure data sets associated with at least one failed sector of a disk and collected in a first time period; and based on the trained failure determining model obtained according to the first aspect of the present disclosure and the plurality of disk failure data sets, determining failure information of at least one failed sector set to which the at least one failed sector belongs at a predetermined time point after the first time period.

In a third aspect of the present disclosure, an electronic device is provided. The electronic device includes: at least one processing unit; and at least one memory, coupled to the at least one processing unit and storing instructions for execution by the at least one processing unit, wherein, when executed by the at least one processing unit, the instructions enable the device to carry out actions, the actions comprising: acquiring a plurality of disk failure data sets associated with at least one failed sector of a disk and collected in a first time period; acquiring another disk failure data set associated with the at least one failed sector and collected at a predetermined time point after the first time period, the another disk failure data set indicating failure information of at least one failed sector set to which the at least one failed sector belongs; and training a failure determining model based on the plurality of disk failure data sets and the failure information, so that a probability of matching of predicted failure information at a predetermined time point determined by the trained failure determining model based on the plurality of disk failure data sets and the failure information is greater than a first threshold probability.

In a fourth aspect of the present disclosure, an electronic device is provided. The electronic device includes: at least one processing unit; and at least one memory, coupled to the at least one processing unit and storing instructions for execution by the at least one processing unit, wherein, when executed by the at least one processing unit, the instructions enable the device to carry out actions, the actions comprising: acquiring a plurality of disk failure data sets associated with at least one failed sector of a disk and collected in a first time period; and based on the trained failure determining model obtained according to the third aspect of the present disclosure and the plurality of disk failure data sets, determining failure information of at least one failed sector set to which the at least one failed sector belongs at a predetermined time point after the first time period.

In a fifth aspect of the present disclosure, a computer program product is provided. The computer program product is tangibly stored on a non-transitory computer-readable medium and includes machine-executable instructions, and when executed, the machine-executable instructions enable a machine to carry out any step of the method according to the first aspect of the present disclosure.

In a sixth aspect of the present disclosure, a computer program product is provided. The computer program product is tangibly stored on a non-transitory computer-readable medium and includes machine-executable instructions, and when executed, the machine-executable instructions enable a machine to carry out any step of the method according to the second aspect of the present disclosure.

The summary of the invention is provided to introduce the selection of concepts in a simplified form, which will be further described in the detailed description below. The summary of the invention is not intended to identify key features or essential features of the embodiments of the present disclosure, nor is it intended to limit the scope of the embodiments of the present disclosure.

BRIEF DESCRIPTION OF THE DRAWINGS

The above and other objectives, features, and advantages of the present disclosure will become more apparent by describing exemplary embodiments of the present disclosure in more detail with reference to the drawings, and in the exemplary embodiments of the present disclosure, the same reference numerals generally represent the same parts.

In the accompanying drawings, the same or corresponding numerals indicate the same or corresponding parts.

DETAILED DESCRIPTION

Figure 1:
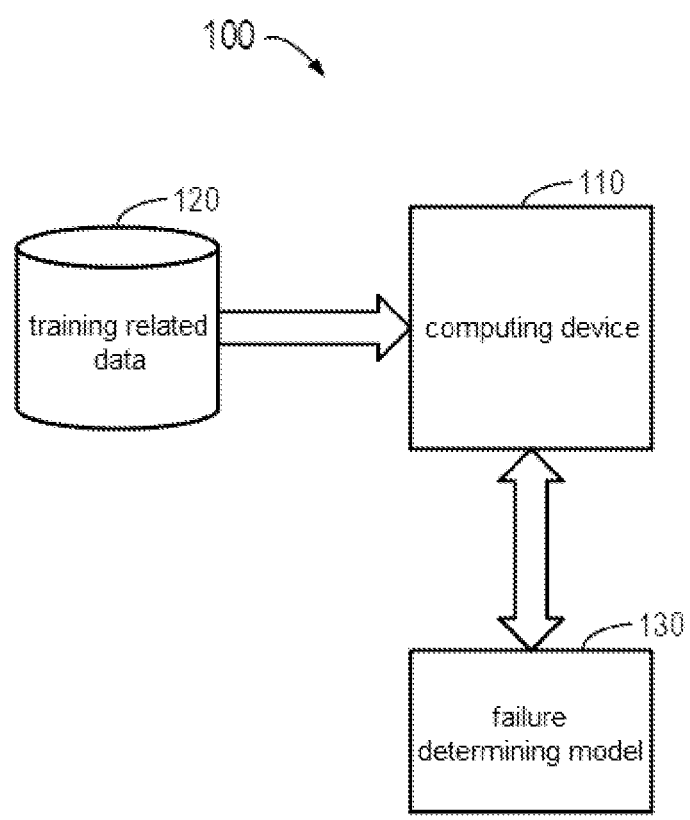
FIG. 1 shows a schematic diagram of a model training environment 100 in which a device and/or a method according to an embodiment of the present disclosure may be implemented.

Preferred embodiments of the present disclosure will be described in more detail below with reference to the drawings. Although the preferred embodiments of the present disclosure are shown in the drawings, it should be understood that the present disclosure can be implemented in various forms and should not be limited by the embodiments set forth herein. On the contrary, these embodiments are provided to make the present disclosure more thorough and complete, and to fully convey the scope of the present disclosure to those skilled in the art.

As used herein, the term "include" and variations thereof used herein mean open-ended inclusion, for example, "including but not limited to." Unless specifically stated, the term "or" means "and/or." The term "based on" means "at least partially based on." The terms "an example embodiment" and "an embodiment" mean "at least one embodiment." The term "another embodiment" indicates "at least one additional embodiment." The terms "first," "second," and the like may refer to different or identical objects. Other explicit and implicit definitions may also be included below.

As described above in the background art, the conventional disk failure determination technology has insufficient granularity. Consequently, it cannot support fine-grained processing for a disk, and it is difficult to meet the using needs of users and administrators of the disk.

In order to at least partially solve the above problems and one or more of other potential problems, embodiments of the present disclosure propose a method for monitoring the health condition of the disk with fine granularity, and then determining failures of the disk. In general, in the embodiments of the present disclosure, a disk including a large number of sectors can be divided into, for example, sector sets of the same size, and these sector sets can be called storage blocks and can be used as virtual disks. In addition, in the embodiments of the present disclosure, it is possible to focus on the health condition of sectors or sector sets in a disk, rather than the health condition of the entire disk.

Sector failures of sectors in a disk may include silent failures and input/output access failures.

The silent failure of a sector of a disk refers to a failure occurring during an idle period without any access to the sector, which is more common in disk back-up/archiving scenarios. However, it is generally difficult to determine the silent failure without access to the sector. When the number of sectors with such a failure increases, it will seriously affect the reliability of the storage of the entire system. For example, if it is found that a redundant array of independent disks has too many failures that cannot recover when the disks are read on a certain day, then a data link failure will occur. An existing solution is to periodically clean up the entire disk, but this may bring unexpected additional central processing unit or input and output costs.

The input and output access failure of a disk refers to the slow input and output access to the disk caused by a failed sector, which is caused by the retry and recovery of internal commands of the disk.

In response to the above problems and other potential problems, the present disclosure focuses on how to determine a failed sector set in a disk, and further focuses on how to determine a sector set failure type of the failed sector set. In the embodiments of the present disclosure, a disk failure data set including, for example, a background medium scan log is used to determine a failed sector in the disk, and a failure determining model is constructed and trained to predict the sector set that will fail in the disk and the sector set failure type. In this way, it is possible to predict a sector set of the disk which will fail, so that corresponding strategies can be taken in advance so as to improve system reliability, reduce a storage cost, and increase an access speed.

FIG. 1 shows a schematic block diagram of a model training environment 100 in which model training methods in some embodiments of the present disclosure may be implemented. According to the embodiment of the present disclosure, the model training environment 100 may be a cloud environment.

As shown in FIG. 1, the model training environment 100 includes a computing device 110. In the model training environment 100, for example, training related data 120 is provided to the computing device 110 as input of the computing device 110, and the training related data 120 includes a plurality of disk failure data sets that are associated with at least one failed sector of a disk and are collected in a first time period, and another disk failure data set indicating about failure information of at least one failed sector set to which the at least one failed sector belongs, associated with the at least one failed sector, and collected at a predetermined time point after the first time period, or a part of the foregoing data. According to the embodiment of the present disclosure, the training related data 120 may also include other related data, parameters, and the like required for training a failure determining model 130.

The computing device 110 may interact with the failure determining model 130. For example, the computing device 110 may provide at least a part of the training related data 120 to the failure determining model 130, receive predicted failure information determined by the failure determining model 130 based on the training related data 120 from the failure determining model 130, and by determining whether the predicted failure information determined by the failure determining model 130 matches the failure information indicated by the another disk failure data set, send an instruction to stop training to the failure determining model 130.

It should be understood that the model training environment 100 is only illustrative and not restrictive, and is extensible or shrinkable. For example, the model training environment 100 may include more computing devices 110, more training related data 120 may be provided to the computing device 110 as an input, and the computing device 110 may also interact with more failure determining models 130, so as to meet the demands of more users using more computing devices 110 simultaneously, and even to use more training related data 120 simultaneously or non-simultaneously to train the failure determining models 130.

In the model training environment 100 shown in FIG. 1, the input of the training related data 120 to the computing device 110 and the interaction between the computing device 110 and the failure determining model 130 can be performed via a network.

Figure 2:
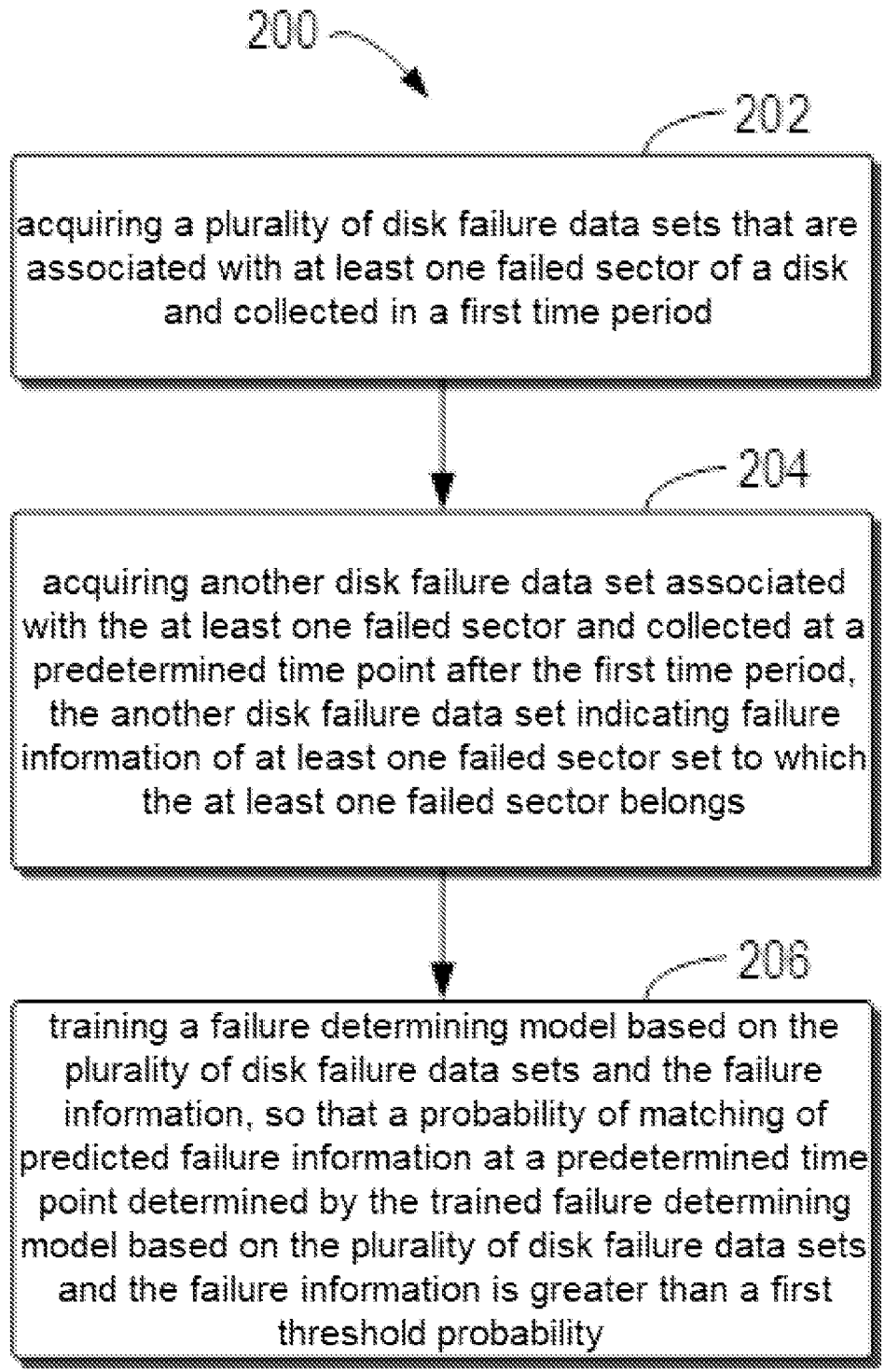
FIG. 2 shows a flow chart of a model training method 200 according to an embodiment of the present disclosure.
Figure 3:
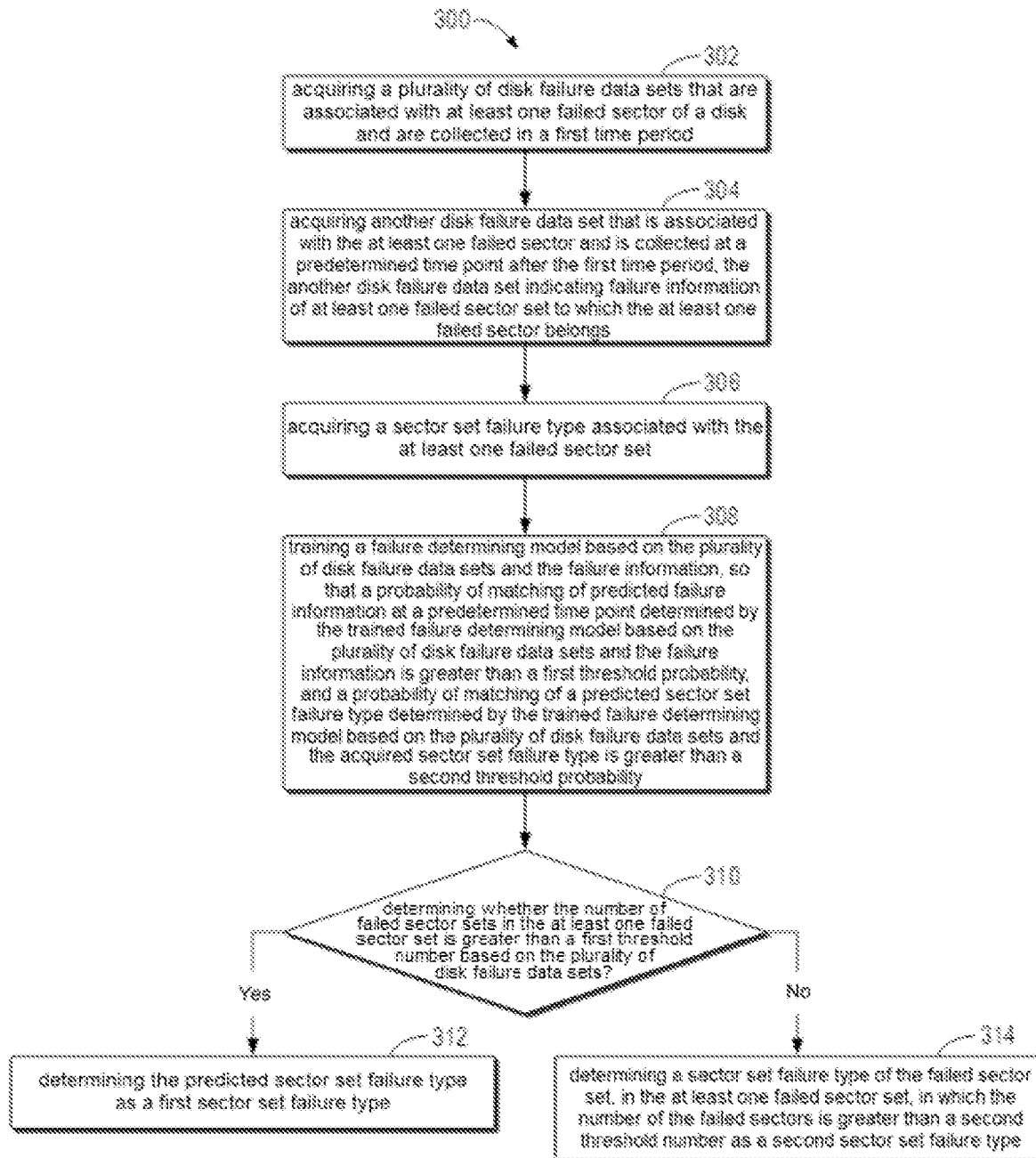
FIG. 3 shows a flow chart of a model training method 300 according to an embodiment of the present disclosure.
Figure 4:
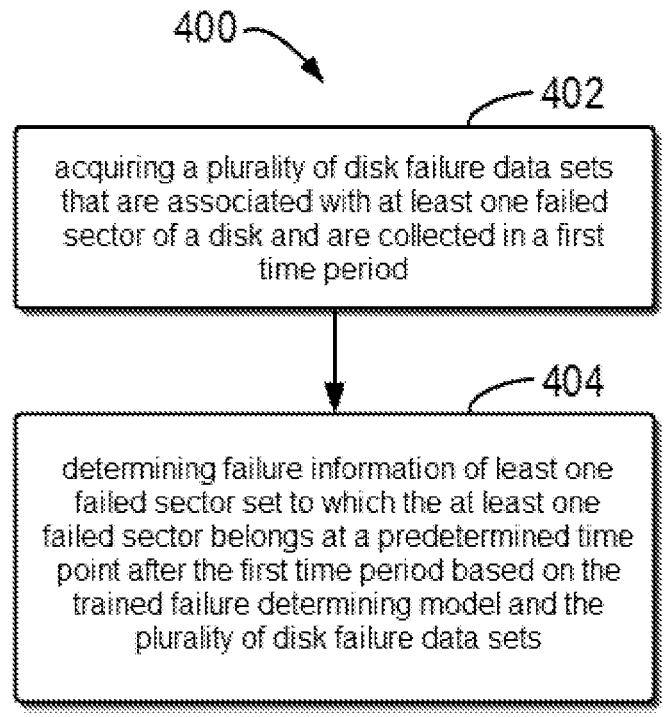
FIG. 4 shows a flow chart of a failure determining method 400 according to an embodiment of the present disclosure.

The following takes the computing device 110, the training related data 120, and the failure determining model 130 included in FIG. 1 as examples to illustrate a model training method 200, a model training method 300, and a failure determining method 400 shown in FIGS. 2, 3, and 4.

FIG. 2 shows a flow chart of the model training method 200 according to an embodiment of the present disclosure. The method 200 may be implemented by the computing device 110 shown in FIG. 1 or by other appropriate devices. It should be understood that the model training method 200 may also include additional steps not shown and/or may omit the steps shown, and the scope of the embodiments of the present disclosure is not limited in this regard.

In block 202, the computing device 110 acquires a plurality of disk failure data sets that are associated with at least one failed sector of a disk and are collected in a first time period. According to the embodiment of the present disclosure, acquiring the plurality of disk failure data sets can include acquiring at least one of the following parameters about each failed sector in the at least one failed sector collected at a first time point in the first time period: background medium scan logs; a log count, indicating the number of background medium scan logs associated with the failed sector in the background medium scan logs; a failure count of sector sets to which the failed sector belongs; and a failure count of sector sets adjacent to the sector set to which the failed sector belongs. According to the embodiment of the present disclosure, the first time point in the first time period may refer to a time point at which any disk failure data set in the plurality of disk failure data sets is collected in the first time period, and the sector set adjacent to the sector set to which the failed sector belongs may refer to a predetermined number of adjacent sector sets before and/or after the sector set to which the failed sector belongs according to addresses in the disk.

The background medium scan (BMS) is a background scan mechanism inside disk firmware. The background medium scan can determine failed sectors in a disk. The failed sectors include sectors that are difficult to read or recover, sectors that cannot be read or recovered, and sectors in which associated log have problems. Through the background medium scan, a background medium scan log can be generated for each sector in the disk every time a failure occurs. In other words, if there are three failures in a certain sector of a disk, three background medium scan logs will be generated for this sector through the background medium scan. The aforementioned log count can be used to reflect the number of the background medium scan logs generated for the same sector.

The background medium scan log can include at least one of the following: power-on time (POM), indicating total power-on time of the disk when the failed sector fails; identification of the failed sector; and a failure type of the failed sector. The identification of the failed sector may include, for example, a logical block address for indicating the failed sector. The failure type of the failed sector may include, for example, a sector medium failure or a sector recovery failure, which can be indicated by the SENSE KEY field in the background medium scan log. When a sector in a disk cannot be read or written due to a medium defect, the sector medium failure will occur. When a command is successfully completed, but a retry or error correction within the disk firmware is required to retrieve the data, the sector recovery failure will occur.

In a block 204, the computing device 110 acquires another disk failure data set that is associated with the at least one failed sector and is collected at a predetermined time point after the first time period. According to the embodiment of the present disclosure, the another disk failure data set indicates failure information about at least one failed sector set to which the at least one failed sector belongs.

According to the embodiment of the present disclosure, the manner of collecting the plurality of disk failure data sets in the first time period may be the same as the manner of collecting the another disk failure data set at a predetermined time point after the first time period. Moreover, an interval time for collecting two adjacent disk failure data sets in the plurality of disk failure data sets may be the same as an interval time from the end of the first time period to the foregoing predetermined time point. In other words, collecting the plurality of disk failure data sets may refer to the previous N times of collecting, and collecting the another disk failure data set may refer to the (N+1)th time of collecting.

According to the embodiments of the present disclosure, a failed sector in a disk may have a higher spatial locality, and the failed sectors may have a higher correlation, which means that a failed sector or a failed sector set adjacent to the failed sector or the failed sector set will often be detected to have a failure in a next background medium scan. In an example, all failed sectors can be concentrated in a small area, and the area only accounts for 0.0014% of the total disk capacity.

In a block 206, the computing device 110 trains a failure determining model based on the plurality of disk failure data sets and the failure information, so that a probability of matching of predicted failure information at a predetermined time point determined by the trained failure determining model based on the plurality of disk failure data sets and the failure information is greater than a first threshold probability.

According to the embodiment of the present disclosure, the failure determining model may be a machine learning model constructed based on the random forest method and used to predict the failed sector set.

According to the embodiment of the present disclosure, the block 202 and the block 204 involve acquiring samples for training a failure determining model. The block 202 involves acquiring data required for determining failure information, and the block 204 involves acquiring a reference standard answer used to confirm whether the predicted failure information determined by the trained failure determining model is correct. Therefore, in the block 206, the computing device 110 can continuously adjust parameters of the failure determining model in training, so that the probability of matching of the predicted failure information at a predetermined time point determined by the trained failure determining model based on the plurality of disk failure data sets and the failure information is greater than the first threshold probability, that is, the predicted failure information converges to the failure information indicated by the another disk failure data set obtained in the block 204.

FIG. 3 shows a flow chart of the model training method 300 according to an embodiment of the present disclosure. The method 300 may be implemented by the computing device 110 shown in FIG. 1 or by other appropriate devices. It should be understood that the model training method 300 may also include additional steps not shown and/or may omit the steps shown, and the scope of the embodiments of the present disclosure is not limited in this regard.

In a block 302, the computing device 110 acquires a plurality of disk failure data sets that are associated with at least one failed sector of a disk and are collected in a first time period. The content involved in the block 302 is the same as the content involved in the block 202, and will not be repeated here.

In a block 304, the computing device 110 acquires another disk failure data set that is associated with the at least one failed sector and is collected at a predetermined time point after the first time period. The content involved in the block 304 is the same as the content involved in the block 204, and will not be repeated here.

In a block 306, the computing device 110 acquires a sector set failure type associated with the at least one failed sector set. According to the embodiment of the present disclosure, the block 302 also involves acquiring data required for determining failure information, and the block 304 also involves acquiring a reference standard answer for confirming whether the predicted failure information determined by the trained failure determining model is correct, and therefore, the sector set failure type associated with the at least one failed sector set may be a manually marked sector set failure type.

In a block 308, the computing device 110 trains a failure determining model based on the plurality of disk failure data sets and the failure information, so that a probability of matching of predicted failure information at a predetermined time point determined by the trained failure determining model based on the plurality of disk failure data sets and the failure information is greater than a first threshold probability, and a probability of matching of a predicted sector set failure type determined by the trained failure determining model based on the plurality of disk failure data sets and the acquired sector set failure type is greater than a second threshold probability. The computing device 110 involved in the block 308 trains the failure determining model based on the plurality of disk failure data sets and the failure information, so that the probability of matching of the predicted failure information at a predetermined time point determined by the trained failure determining model based on the plurality of disk failure data sets and the failure information is greater than the first threshold probability, which is the same as the content involved in the block 206, and will not be repeated here.

According to the embodiment of the present disclosure, the block 302, the block 304, and the block 306 involve acquiring samples for training the failure determining model. The block 306 involves acquiring a reference standard answer for confirming whether the predicted sector set failure type determined by the trained failure determining model is correct. Therefore, in the block 308, the computing device 110 can continuously adjust the parameters of the failure determining model in training, so that the probability of matching of the predicted sector set failure type determined by the trained failure determining model based on the plurality of disk failure data sets and the acquired sector set failure type is greater than the second threshold probability, that is, the predicted sector set failure type converges to the sector set failure type acquired in the block 306.

In a block 310, the computing device 110 determines whether the number of failed sector sets in the at least one failed sector set is greater than a first threshold number based on the plurality of disk failure data sets. When the computing device 110 determines that the number of the failed sector sets in the at least one failed sector set is greater than the first threshold number based on the plurality of disk failure data sets, the method 300 proceeds to a block 312. Otherwise, the method 300 proceeds to a block 314.

According to the embodiment of the present disclosure, the first threshold number may be a preset number set according to the number of sector sets included in the disk. The larger the number of the sector sets included in the disk, the larger the first threshold number can be.

In the block 312, the computing device 110 determines the predicted sector set failure type as a first sector set failure type. According to the embodiment of the present disclosure, the first sector set failure type indicates that the number of the failed sector sets in the disk is relatively large.

In a block 314, the computing device 110 determines a sector set failure type of the failed sector set, in the at least one failed sector set, in which the number of the failed sectors is greater than a second threshold number as a second sector set failure type.

According to the embodiment of the present disclosure, the second threshold number may be a preset number set according to the number of sectors in the sector sets included in the disk. The larger the number of the sectors included in the sector sets, the larger the second threshold number can be.

According to the embodiment of the present disclosure, the second sector set failure type indicates that the number of failed sectors in a certain sector set is relatively large.

According to the embodiment of the present disclosure, when a certain set of failure sectors is neither the first sector set failure type nor the second sector set failure type, the computing device 110 may determine this failed sector set as a third sector type, and the third sector set failure type indicates that the number of failed sectors in a certain sector set is small.

It should be understood that the method 300 includes more steps than the method 200 and can be considered as an extension of the method 200.

FIG. 4 shows a flow chart of a failure determining method 400 according to an embodiment of the present disclosure. The method 400 may be implemented by the computing device 110 shown in FIG. 1 or by other appropriate devices. It should be understood that the failure determining method 400 may also include additional steps that are not shown and/or may omit the shown steps, and the scope of the embodiment of the present disclosure is not limited in this aspect.

In a block 402, the computing device 110 acquires a plurality of disk failure data sets that are associated with at least one failed sector of a disk and are collected in a first time period. The content involved in the block 402 is the same as the content involved in the block 202 and the block 302, and will not be repeated here.

In a block 404, the computing device 110 determines failure information of at least one failed sector set to which the at least one failed sector belongs at a predetermined time point after the first time period based on the trained failure determining model obtained according to the model training method 200 or the model training method 300 and the plurality of disk failure data sets acquired in the block 402.

According to the embodiment of the present disclosure, determining the failure information of the at least one failed sector set to which the at least one failed sector belongs at a predetermined time point after the first time period may include determining the foregoing failure information and a sector set failure type associated with the at least one failed sector set.

According to some embodiments of the present disclosure, determining the sector set failure type may include if it is determined that the number of failed sector sets in the at least one failed sector set is greater than a first threshold number, then determining the sector set failure type as a first sector set failure type.

According to some other embodiments of the present disclosure, determining the sector set failure type may include if it is determined that the number of the failed sector sets in the at least one failed sector set is less than or equal to the first threshold number, then determining the sector set failure type of a failed sector set, in the at least one failed sector set, in which the number of failed sectors is greater than a second threshold number as a second sector set failure type.

The related content of the model training environment 100 in which the device and/or the method according to the embodiment of the present disclosure may be implemented, the model training method 200 according to the embodiment of the present disclosure, the model training method 300 according to the embodiment of the present disclosure, and the failure determining method 400 according to the embodiment of the present disclosure are described above with reference to FIGS. 1 to 4. It should be understood that the above description is intended to better demonstrate the content recorded in the embodiments of the present disclosure, and is not intended to limit the present disclosure in any way.

It should be understood that the number of various elements and the magnitudes of physical quantities used in the embodiments and the drawings of the present disclosure are only examples, and are not intended to limit the protection scope of the embodiments of the present disclosure. The above numbers and magnitudes may be arbitrarily set as needed without affecting normal implementation of the embodiments of the present disclosure.

Through the above description with reference to FIGS. 1 to 4, according to the technical solutions of the embodiments of the present disclosure, a model training method and a failure determining method are proposed, which can predict the failure information that will occur on a sector set included in a disk based on the disk failure data set associated with a failed sector, and therefore a user or administrator of the disk can know in advance the failure status that will occur on the sector set of the disk. In addition, based on the model training method and the failure determining method proposed in the technical solutions of the embodiments of the present disclosure, the sector set failure type of the failed sector set can also be determined, so that the user or administrator of the disk can know in advance the failure type that the sector set of the disk will have.

The following describes the technical effects of the failure determining method according to the embodiment of the present disclosure in conjunction with two examples by using a true positive rate (TPR) and a false positive rate (FPR). In the example of the present disclosure, the true positive rate refers to the percentage of correct identification of sector sets that will fail in the future, and the false positive rate refers to the percentage of incorrect identification of sector sets that will not fail in the future. In two examples, for a 4 TB disk with firmware "GS1F," the true positive rate based on the collected disk failure data set for failure determination reaches 98.21%, while the false positive rate is only 0.913%. For an 8 TB disk with firmware "UM02," the true positive rate based on the collected disk failure data set for failure determination reaches 98.17%, while the false positive rate is only 0.4%. It can be seen that the failure determining method according to the present disclosure has very high credibility.

Figure 5:
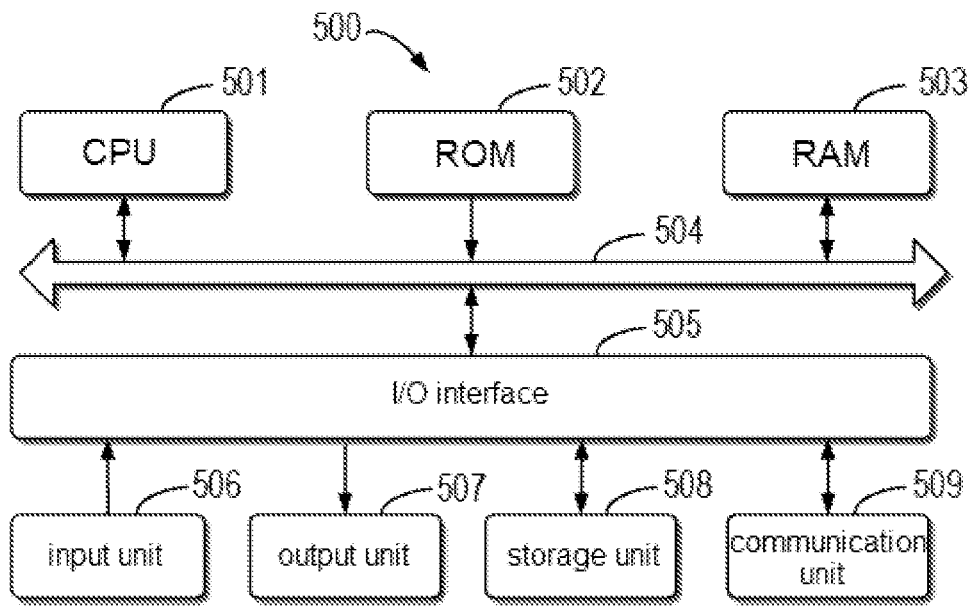
FIG. 5 shows a schematic block diagram of an example device 500 that can be used to implement embodiments of the present disclosure.

FIG. 5 shows a schematic block diagram of an example device 500 that can be used to implement embodiments of the present disclosure. According to the embodiments of the present disclosure, the computing device 110 in FIG. 1 may be implemented by the device 500. As shown in the figure, the device 500 includes a central processing unit (CPU) 501 that may execute various appropriate actions and processing according to computer program instructions stored in a read-only memory (ROM) 502 or computer program instructions loaded into a random access memory (RAM) 503 from a storage unit 508. Various programs and data required for the operation of the device 500 may also be stored in RAM 503. CPU 501, ROM 502, and RAM 503 are connected to each other through a bus 504. An input/output (I/O) interface 505 is also connected to the bus 504.

A plurality of components in the device 500 are connected to the I/O interface 505, including: an input unit 506, such as a keyboard and a mouse; an output unit 507, such as various types of displays and speakers; the storage unit 508, such as a disk and an optical disc; and a communication unit 509, such as a network card, a modem, and a wireless communication transceiver. The communication unit 509 allows the device 500 to exchange information/data with other devices via a computer network, such as the Internet, and/or various telecommunication networks.

The various processes and processing of the methods 200, 300, and 400 described above may be performed by the processing unit 501. For example, in some embodiments, the methods 200, 300, and 400 may be implemented as a computer software program that is tangibly included in a machine-readable medium such as the storage unit 508. In some embodiments, part or all of computer programs may be loaded and/or installed to the device 500 via ROM 502 and/or the communication unit 509. When the computer program is loaded to RAM 503 and executed by CPU 501, one or more actions in the methods 200, 300, and 400 described above can be executed.

The embodiments of the present disclosure may relate to a method, a device, a system, and/or a computer program product. The computer program product may include a computer-readable storage medium on which computer-readable program instructions for performing various aspects of the embodiments of the present disclosure are loaded.

The computer-readable storage medium may be a tangible device that may hold and store instructions used by an instruction executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples as a non-exhaustive list of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a protruding structure within a groove having instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media such as optical pulses passing through fiber-optic cables, or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for performing the operations of the embodiments of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions may be executed entirely on a user computer, partly on a user computer, as a stand-alone software package, partly on a user computer and partly on a remote computer, or entirely on a remote computer or a server. In a case where the remote computer is involved, the remote computer may be connected to the user computer over any kind of networks, including the local area network (LAN) or the wide area network (WAN), or may be connected to the external computer, for example, through the Internet by using an Internet service provider. In some embodiments, an electronic circuit, for example, a programmable logic circuit, a field programmable gate array (FPGA), or a programmable logic array (PLA), is subjected to personalized customization by utilizing state information of the computer-readable program instructions, wherein the electronic circuit may execute the computer-readable program instructions so as to implement various aspects of the embodiments of the present disclosure.

Various aspects of the embodiments of the present disclosure are described here with reference to the flow charts and/or block diagrams of the methods, the devices/systems, and the computer program products according to the embodiments of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or a further programmable data processing device, thereby producing a machine, such that these instructions, when executed by the processing unit of the computer or the further programmable data processing device, produce a device for implementing functions/actions specified in one or more blocks in the flow charts and/or the block diagrams. These computer-readable program instructions may also be stored in the computer-readable storage medium, and these instructions cause a computer, the programmable data processing device, and/or other devices to operate in a specific manner; and thus the computer-readable medium having instructions stored includes an article of manufacture that includes instructions that implement various aspects of the functions/actions specified in one or more blocks in the flow charts and/or the block diagrams.

The computer-readable program instructions may also be loaded to a computer, other programmable data processing devices, or other devices, so that a series of operating steps may be performed on the computer, other programmable data processing devices, or other devices to produce a computer-implemented process, such that the instructions executed on the computer, other programmable data processing devices, or other devices implement the functions/actions specified in one or more blocks in the flow charts and/or the block diagrams.

The flow charts and block diagrams in the drawings show the architectures, functions, and operations of possible implementations of the systems, the methods, and the computer program products according to the multiple embodiments of the present disclosure. In this regard, each block in the flow charts or block diagrams may represent a module, a program segment, or part of an instruction, and the module, the program segment, or part of the instruction include one or more executable instructions for implementing specified logical functions. In some alternative implementations, functions marked in the blocks may also occur in an order different from that marked in the drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or implemented using a combination of special hardware and computer instructions.

The various embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

The invention claimed is:

1. A model training method, comprising:
  acquiring a plurality of disk failure data sets associated with at least one failed sector of a disk and collected in a first time period;
  acquiring another disk failure data set associated with the at least one failed sector and collected at a predetermined time point after the first time period, the another disk failure data set indicating failure information of at least one failed sector set to which the at least one failed sector belongs; and
  training a failure determining model based on the plurality of disk failure data sets and the failure information collected at the predetermined time point after the first time period, so that a probability of matching of predicted failure information at a predetermined time point determined by the trained failure determining model based on the plurality of disk failure data sets and the failure information is greater than a first threshold probability.

2. The method according to claim 1, wherein acquiring the plurality of disk failure data sets comprises:
acquiring at least one of the following parameters about each failed sector in the at least one failed sector collected at a first time point in the first time period:
background medium scan logs,
a log count, indicating a number of background medium scan logs associated with the failed sector in the background medium scan logs,
a failure count of sector sets to which the failed sector belongs, and
a failure count of sector sets adjacent to a sector set to which the failed sector belongs.

3. The method according to claim 2, wherein the background medium scan logs comprise at least one of the following:
power-on time, indicating total power-on time of the disk when the failed sector fails;
identification of the failed sector; and
a failure type of the failed sector.

4. The method according to claim 3, wherein the failure type of the failed sector comprises:
a sector medium failure; or
a sector recovery failure.

5. The method according to claim 1, further comprising:
acquiring a sector set failure type associated with the at least one failed sector set; and
wherein training the failure determining model comprises:
training the failure determining model so that a probability of matching of a predicted sector set failure type determined by the trained failure determining model based on the plurality of disk failure data sets and the acquired sector set failure type is greater than a second threshold probability.

6. The method according to claim 5, further comprising:
if it is determined based on the plurality of disk failure data sets that a number of failed sector sets in the at least one failed sector set is greater than a first threshold number, then determining the predicted sector set failure type as a first sector set failure type.

7. The method according to claim 5, further comprising:
if it is determined based on the plurality of disk failure data sets that a number of the failed sector sets in the at least one failed sector set is less than or equal to a first threshold number, then determining the sector set failure type of a failed sector set, in the at least one failed sector set, in which a number of failed sectors is greater than a second threshold number as a second sector set failure type.

8. A failure determining method, comprising:
acquiring a plurality of disk failure data sets associated with at least one failed sector of a disk and collected in a first time period; and
determining, using a failure determining model and based on the plurality of disk failure data sets, failure information of at least one failed sector set to which the at least one failed sector belongs at a predetermined time point after the first time period, wherein
the failure determining model was trained using a plurality of known disk failure data sets associated with at least one known failed sector of a known disk collected in a second time period and another known disk failure data set, collected at a predetermined time point, and associated with the at least one known failed sector; and
the another known disk failure data set indicating failure information of at least one known failed sector set to which the at least one known failed sector belongs.

9. The method according to claim 8, wherein determining the failure information comprises:
determining the failure information and a sector set failure type associated with the at least one failed sector set.

10. The method according to claim 9, wherein determining the sector set failure type comprises:
if it is determined that a number of failed sector sets in the at least one failed sector set is greater than a first threshold number, then determining the sector set failure type as a first sector set failure type.

11. The method according to claim 9, wherein determining the sector set failure type comprises:
if it is determined that a number of the failed sector sets in the at least one failed sector set is less than or equal to a first threshold number, then determining the sector set failure type of a failed sector set, in the at least one failed sector set, in which a number of failed sectors is greater than a second threshold number as a second sector set failure type.

12. An electronic device, comprising:
at least one processor; and
at least one memory storing instructions, which when executed by the at least one processor, cause the at least one processor to perform actions, the actions comprising:
acquiring a plurality of disk failure data sets associated with at least one failed sector of a disk and collected in a first time period;
acquiring another disk failure data set associated with the at least one failed sector and collected at a predetermined time point after the first time period, the another disk failure data set indicating failure information of at least one failed sector set to which the at least one failed sector belongs; and
training a failure determining model based on the plurality of disk failure data sets and the failure information collected at the predetermined time point after the first time period, so that a probability of matching of predicted failure information at a predetermined time point determined by the trained failure determining model based on the plurality of disk failure data sets and the failure information is greater than a first threshold probability.

13. The electronic device according to claim 12, wherein acquiring the plurality of disk failure data sets comprises:
acquiring at least one of the following parameters about each failed sector in the at least one failed sector collected at a first time point in the first time period:
background medium scan logs,
a log count, indicating a number of background medium scan logs associated with the failed sector in the background medium scan logs,
a failure count of sector sets to which the failed sector belongs, and
a failure count of sector sets adjacent to the sector set to which the failed sector belongs.

14. The electronic device according to claim 13, wherein the background medium scan logs comprise at least one of the following:

power-on time, indicating total power-on time of the disk when the failed sector fails;

identification of the failed sector; and a failure type of the failed sector.

15. The electronic device according to claim 14, wherein the failure type of the sector comprises:

a sector medium failure; or a sector recovery failure.

16. The electronic device according to claim 12, wherein the actions further comprise:

acquiring a sector set failure type associated with the at least one failed sector set; and wherein training the failure determining model comprises:

training the failure determining model so that a probability of matching of a predicted sector set failure type determined by the trained failure determining model based on the plurality of disk failure data sets and the acquired sector set failure type is greater than a second threshold probability.

17. The electronic device according to claim 12, wherein the actions further comprise:

if it is determined based on the plurality of disk failure data sets that a number of failed sector sets in the at least one failed sector set is greater than a first threshold number, then determining the predicted sector set failure type as a first sector set failure type.

18. The electronic device according to claim 12, wherein the actions further comprise:

if it is determined based on the plurality of disk failure data sets that a number of the failed sector sets in the at least one failed sector set is less than or equal to a first threshold number, then determining the sector set failure type of a failed sector set, in the at least one failed sector set, in which a number of failed sectors is greater than a second threshold number as a second sector set failure type.

* * * * *